United States Patent [19]

Iizuka et al.

[11] Patent Number: 5,585,125
[45] Date of Patent: Dec. 17, 1996

[54] MOLDING METHOD AND COOLING APPARATUS FOR PRESSURE RESISTING BOTTLES OF SYNTHETIC RESIN

[75] Inventors: Takao Iizuka; Mamoru Oshida; Makoto Takada, all of Tokyo, Japan

[73] Assignee: Yoshino Kogyosho Co., Ltd., Tokyo, Japan

[21] Appl. No.: 211,165

[22] PCT Filed: Jul. 20, 1992

[86] PCT No.: PCT/JP93/01011

§ 371 Date: Jun. 21, 1969

§ 102(e) Date: Jun. 21, 1994

[87] PCT Pub. No.: WO94/02304

PCT Pub. Date: Feb. 3, 1994

[30] Foreign Application Priority Data

Jul. 20, 1992 [JP] Japan ..................... 4-214533

[51] Int. Cl.$^6$ .................................................. B29C 49/64
[52] U.S. Cl. .................. 425/446; 425/404; 425/445; 425/526; 264/520; 264/528; 264/534
[58] Field of Search ..................... 264/520, 528, 264/530, 534, 237, 348; 425/526, 404, 446, 445; 215/375

[56] References Cited

U.S. PATENT DOCUMENTS

| | | | |
|---|---|---|---|
| 4,035,455 | 7/1977 | Rosenkranz et al. | 264/534 |
| 4,267,144 | 5/1981 | Collette et al. | 264/523 |
| 4,522,779 | 6/1985 | Jabarin | 264/905 |
| 4,853,171 | 8/1989 | Ajmera | 264/905 |
| 5,035,931 | 7/1991 | Yamada et al. | |

FOREIGN PATENT DOCUMENTS

| | | | |
|---|---|---|---|
| 57-053326 | 3/1982 | Japan | 264/905 |
| 2-74319 | 3/1990 | Japan | |
| 2-127023 | 5/1990 | Japan | |
| 3-9831 | 1/1991 | Japan | |

Primary Examiner—Catherine Timm
Attorney, Agent, or Firm—Oliff & Berridge

[57] ABSTRACT

In order to improve the productivity of pressure-resisting bottles by reducing the blow time from 4–5 seconds in a conventional bottle molding method to not more than 3 seconds, and mold pressure resisting bottles free from the occurrence of crazing and bottom-breakage, a biaxially stretched blow molded bottle (1) of a synthetic resin having a big foot type petaloid bottom is produced in a blow time of not more than 3 seconds, and after the product has been released from the mold, the bottom portion (3) has become not higher than 70° C., whereby the shortage of the capability of the metal mold of cooling the bottom portion (3) is supplemented. This allows both the prevention of the irregular deformation of the central part (6) of the bottom portion, and the molding of the bottom portion (3) of high pressure resisting strength and mechanical strength with a sufficient height H of the central part (6) of the bottom portion ensured.

2 Claims, 5 Drawing Sheets

MOLDING METHOD AND COOLING APPARATUS FOR PRESSURE RESISTING BOTTLES OF SYNTHETIC RESIN

BACKGROUND OF THE INVENTION

1. Field of the Invention

The present invention relates to molding methods and a cooling apparatus for pressure resistant bottles of synthetic resin, especially polyethylene terephthalate resin (hereinafter called PET).

2. Background of the Invention

Recently, biaxially stretched big PET bottles, such as 1.5 liter bottles, are widely used. These bottles are big foot type petaloid bottles which are the only bottles that have self-standing bottle bodies. Prior bottles are composed of a bottle body having a round bottom portion and a base cup attached to the round bottom portion. The bottom portion of the big foot type petaloid bottle has a complex structure to enable itself to be self-standing and to resist an inner pressure. The big foot type petaloid bottle does not require a base cup, so that, compared to the prior bottle, it has higher productivity and less scrap problem after use.

Figure 4:
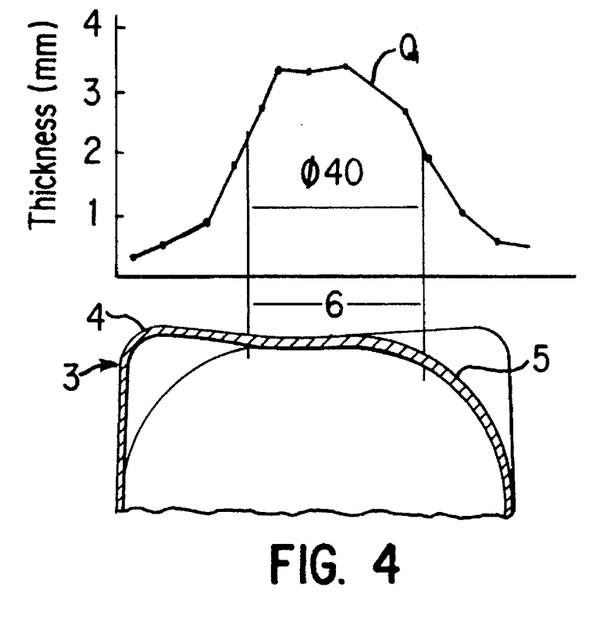
FIG. 4 shows a graph of a distribution of a wall thickness of a bottom portion.

The distribution of wall thickness of a 1.5 liter pressure resisting bottle is shown in FIG. 4. The central part 6 (a range of 40 φ of the undersurface of the bottom portion 3) is thicker than the thickness of the leg portion 3 and the valley portion 5 as shown by line a. The thickness of the central part 6 is more than 2 mm.

The central part 6 of the bottom 3 is required to be thick. When the central part 6 is thin, it lacks mechanical strength and induces crazing and bottom-breakage. This is caused by the high temperature and pressure generated after a substance is filled in the bottle.

Figure 8:
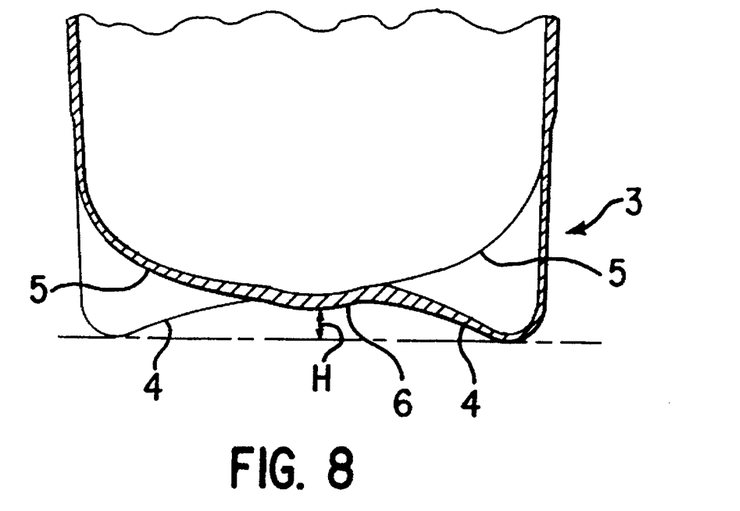
FIG. 8 shows a sectional view of a deformation of the bottom portion of a bottle because of the lack of cooling after being released from the mold.

Therefore, the bottom part 6 of the bottle should be thicker compared to other parts of the bottle. However, since the bottom part 6 is thicker, it takes longer for the bottom part 6 to cool to a certain temperature (normally, to the temperature of glass transition point of the synthetic resin). When the blowing time is short and the center part 6 is not cooled enough, the center part 6 of the bottle projects outwardly, as shown in FIG. 8, after being released from the mold.

Figure 5:
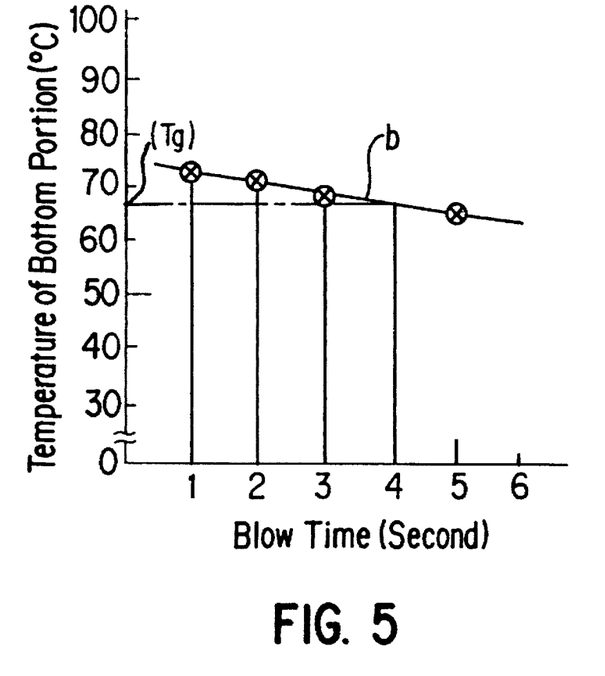
FIG. 5 shows a graph of temperature characteristic of a center part of the bottom portion against blow time of a bottle.

In the past, to prevent deformation of the center part 6, blowing time is set to more than 4 seconds to cool the center part 6 by a blow mold. The temperature characteristic curve b in FIG. 5 shows a relationship between blow time and temperature of the center part 6, which is measured 7 seconds after a bottle is released from a blow mold. It is clear from this temperature characteristic curve b that to prevent deformation of the center part 6 and to cool it below the glass transition point, blow time of longer than 4 seconds is required.

Figure 6:
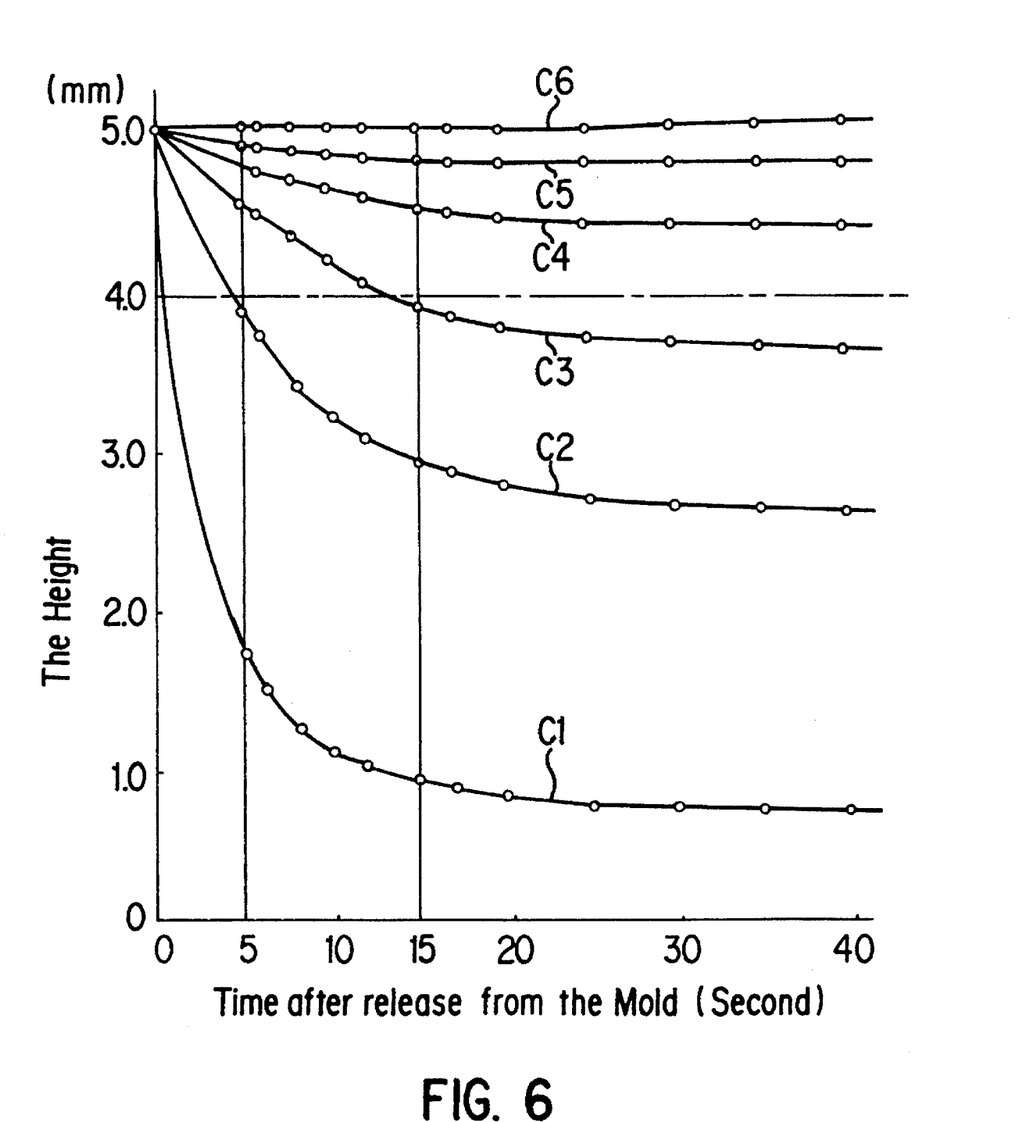
FIG. 6 shows a graph of various characteristics of the height according to various blow time after release from the mold.

FIG. 6 shows a variation characteristic of blow time which varies depending on the height H (see FIG. 8) between the bottom edged of the leg portion 4 and the center undersurface of the center part 6. In FIG. 6, the characteristic curve C1 indicates that 1 second of blow time is applied, c2 indicates 2 seconds of blow time, c3 indicates 3 seconds of blow time, c4 indicates 4 seconds of blow time, c5 indicates 5 seconds of blow time and c6 indicates 7 seconds of blow time. From experience, crazing and breakage are prevented for a height H of 4.0 mm or more. According to FIG. 6, more than 4 seconds of blow time are required. However, if more than 4 seconds of blow time are applied, productivity fails to improve.

To increase productivity, a number of ideas is discussed, such as to improve the cooling capacity of the blow mold or to make the wall of a blow mold thinner, thereby affecting the cooling agent to the mold face of the blow mold. However, such ideas do not efficiently cool the center part of a bottle while raising the cost for equipment.

Therefore, the object of the invention is to shorten the blow time and improve productivity. Further, the mechanical strength of the bottom portion of the bottle is improved.

SUMMARY OF THE INVENTION

The invention provides a molding method for producing pressure resistant bottles of synthetic resin by blowing the bottle in a blow mold for about 2 seconds. Within 4 seconds after the bottle is released from the blow mold, the center part of the bottom portion of the bottle is compulsively cooled below about 70° C. within a time of 5.5 seconds to 7.0 seconds.

Another molding method for producing the pressure resistant bottles of synthetic resin comprising a big foot type petaloid bottom is as follows: 1) Blow mold the bottle with a blowing time of about 1.5 seconds to 3.0 seconds. 2) Within 15 seconds after the bottle is released from the blow mold, the projecting deformation of the center part of the bottom portion formed after being released from the blow mold is forced onto a reform jig and is pushed back to the maximum original position. Concurrently, the inside of the bottle is pressurized and the center part is cooled below about 70° C.

Another molding method for producing the pressure resistant bottles of synthetic resin comprising a big foot type petaloid bottom is to blow mold the bottle with a blowing time of about 1.5 seconds to 3.0 seconds. Within 15 seconds after the bottle is released from the blow mold, the center part of the bottom portion is forced onto a double-form jig to raise the height of the center portion above the original height from the blow mold while the inside of the bottle is pressurized and the center part is cooled below about 70° C.

The invention provides a cooling apparatus for pressure resistant bottles of synthetic resin having a big foot type petaloid bottom for cooling the bottom immediately after the bottle is released from a blow mold. The cooling apparatus includes a reform jig comprising a mold face. A projecting height of a center part of the mold face is similar to the height of the center part of a bottom mold of a molding device. Other portions of the reform jig are also similar to the molding device. A jet mouth for cooling air is formed at the center part of the mold face. A press jig, capable of holding the bottle and cooperating with the reform jig, presses the bottom portion onto a mold surface of the reform jig and a cooling nozzle, capable of entering inside the bottle, blows air onto the upper surface of the bottom portion and pressurize the inside of the bottle.

The invention provides another cooling apparatus for producing the pressure resistant bottles of synthetic resin having a big foot type petaloid bottom for cooling the bottom immediately after the bottle is released from a blow mold. The cooling apparatus includes a double-form jig comprising a mold face. A projecting height of the center part of the mold face is higher than the height of the center part of a bottom mold of a molding device. Other portions of the double-form jig are similar to the molding device. A jet mouth for cooling air is formed at the center part of the mold face. A press jig, capable of holding the bottle cooperating with the double-form jig, presses the bottom portion to a mold surface of the double-form jig and a cooling nozzle capable of entering inside the bottle blowing air onto the upper surface of the bottom portion and pressurizing the inside of the bottle.

The function of the present invention will be described below.

As shown in FIG. 6, even if only 2 seconds of blow time is applied, within 4 seconds after released from the blow mold, the height H of the bottle remains more than 4 mm. Therefore, by cooling a bottle with 2 seconds of blow time, and by compulsively and rapidly cooling the bottom thereof within 4 seconds after being released from the blow mold, the height H of the center part of the bottom portion of the bottle is higher than 4 mm.

By arranging the compulsive rapid cooling of the bottom portion of the bottle so that the temperature of the center part of the bottom portion decreases below 70° C. within 5.5 to 7.0 seconds, deformation of the center part caused by high heat (about 80° C. when measured) is prevented. The heat comes out of the surface after 25 to 30 seconds after being released from the mold. In addition, cooling and hardening of the bottom portion can be completed.

When the blow time is 1.5 to 3.0 seconds, the height becomes less than 4 mm within 15 seconds after being released from the blow mold. Even 15 seconds after being released from the blow mold, the height of the bottom portion continues to decrease. This indicates that within 15 seconds after a bottle is released from the blow mold, the center part of the bottom portion can be deformed by an outer force.

According to various experimental tests, it is determined that the center part of the bottom portion of a bottle can be deformed to a desired shape by an outer force only when the deformation is applied within 15 seconds after the bottle is released from the mold because of a cooling effect in the atmosphere.

By forcing the center part of the bottom portion of the bottle, which projects outwardly, to a reform jig within 15 seconds after release, the projected center part returns to the blow molded position, the maximum returning position, by repulsive force of the reform jig and then cooled and hardened at that position.

By applying pressure inside the bottle while the bottom portion thereof is forced onto the reform jig, the rest of the bottom portion of the bottle, such as leg and valley portions, do not deform because of the pressure inside the bottle. The compulsive cooling of the bottom portion cools the center part below 70° C. within the shortest period of time, however, the cooling time is not limited to any range.

By increasing the height of the bottom portion, the resistant strength of the bottom portion of the bottle can be improved. However, when the height is set higher by arranging a blow mold, an extension ratio of the leg portion increases so that the bottle cannot be as easily formed and voids are produced.

To avoid the above effects, the height of the bottom portion is blow molded a little lower than the final product. After releasing the bottle from the mold, the center part is deformed by a double-form jig instead of the reform jig until the center part comes up to the final product position and is cooled and hardened.

The above process provides a compulsive shape of the bottom portion that is smoothly blow molded. The height can be maintained high enough, so that the bottle is resistant against high pressure and the bottom does not induce breakage.

A cooling process using the cooling apparatus attaches a bottle released from a blow mold to a reform jig. The bottom portion of the bottle is formed by the form surface of the jig and the mouth portion of the bottle is pushed downward by a press jig. The center part of the bottom portion of the bottle is reformed to the original shape and height, the maximum height, formed in the mold.

While pressing the mouth portion of the bottle by the press jig, cooling air is provided through the cooling nozzle. The upper surface of the bottom portion of the bottle is cooled and the inside of bottle is pressurized. At the same time, the cooling air is flowed from the flow mouth of the reform jig and cools the undersurface of the bottom portion and hardens the center part thereof. The center part of the bottom portion returns to the original shape formed in the mold.

When a double-form jig is applied instead of a reform jig, a similar process as described above is used, and the height of the bottom portion is pushed upward by the jig to be higher than the height previously set by the blow mold.

BRIEF DESCRIPTION OF THE DRAWINGS

The invention is described in detail with reference to the following drawings, wherein.

DETAILED DESCRIPTION OF PREFERRED EMBODIMENTS

Preferred embodiments according to the present invention will be described below referring to the drawings.

Figure 1:
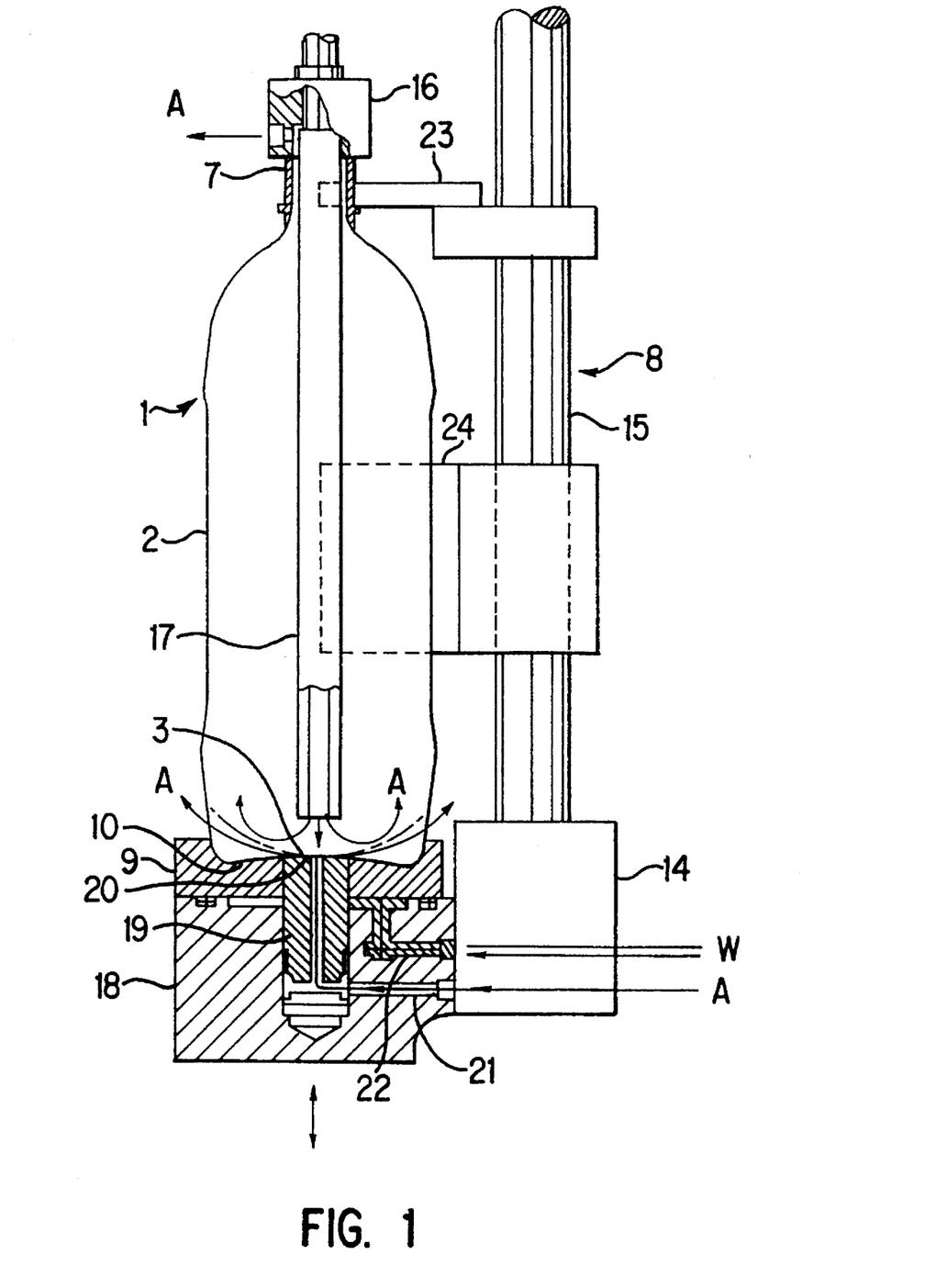
FIG. 1 shows a partial elevation view of a preferred embodiment.

FIG. 1 shows a partial elevation view of a cooling apparatus according to the present invention, wherein a shaft 15 is secured to a base block 14 in a standing position. A holder 23 which holds a mouth portion 7 of a bottle 1 and a handler 24 which holds a body 2 is fixed to the shaft 15. A cooling block 18, positioned below the handler 24, is secured to the base block 14.

On the cooling block 18, there is a reform jig 9 comprising a mold surface 10 having a projecting central portion. The projecting central portion is arranged similar to the form surface of a bottom mold of a blow molding device. The other portions of the mold surface 10 is also arranged similar to the blow molding device. The reform jig 9 is cooled by the cooling water W that flows through a cooling passage 22 provided in the cooling block 18. A passage block 19 forms an air cooling passage 21 of the cooling block 18 and runs in the center of the reform jig 9 in the downward direction. The upper surface comprising recess 20 for the cooling air A to escape is positioned at the center of the mold surface 10 of the reform jig 9. The front edge of the air cooling passage 21 is positioned as a jet mouth of the cooling air A.

A cooling nozzle 17 is fixed to an upper portion of the shaft 15 and is capable of moving in upward and downward directions. A press jig 16 is fixed to the cooling nozzle 17. The press jig 16 comprises passages through which the air in the bottle escapes when the jig 16 is air sealed by the mouth portion 7 of the bottle.

The cooling nozzle 17 moves in the downward direction by a cylinder (not shown) and enter in the bottle 1 through the mouth portion 7. The press jig 16 is arranged such that when the bottom edge of the cooling nozzle 17 comes close to the center part 6 of the bottom portion 3, it pushes the upper surface of the mouth portion 7.

The cooling block 18 is capable of moving downwardly and upwardly for a distance greater than the height of the mold surface 10 of the reform jig 9. The holder 23 and the handler 24 lightly hold the bottle 1 to prevent the bottle 1 from moving laterally and enable the bottle 1 to be moved in the downward and upward directions.

FIG. 1 shows the bottle 1 released from a mold 7 seconds prior to being attached. The bottle 1 is pressed by the press jig 16 with 25 kg/f, and cooled by the cooling air A of 6.5 kg/cm$^2$ supplied through the cooling nozzle 17 and the cooling passage 21. By keeping the inner pressure of the bottle at 6 kg/cm$^2$, the center part 6 of the bottom portion 3 is compulsively cooled for 5 seconds, while the cooling air A is released through two passages of 1.5 mm $\phi$ of the press jig 16.

Tests are applied to bottles which have received 1.5 seconds, 2.0 seconds, 2.5 seconds and 3.0 seconds of air blow. The bottles which are compulsively cooled according to the present invention, the heights H of the bottom portions of the bottles 1 are all 4.2 mm. On the other hand, bottles that have not been compulsively cooled, the heights H are 2.0 mm with 1.5 seconds blow, 2.3 mm within 2.0 seconds blow, 2.7 mm with 2.5 seconds blow and 3.2 mm with 3.0 seconds blow. All of them are under 4.0 mm.

Tests for determining breakage of the bottom portion of the bottle is also done using bottles blown for 2.5 seconds of blow time. For 20 bottles that received the compulsive cooling according to the present invention, no bottle breakage occurred. In contrast, breakages occurred in 18 out of 20 bottles that have not been compulsively cooled.

Figure 2:
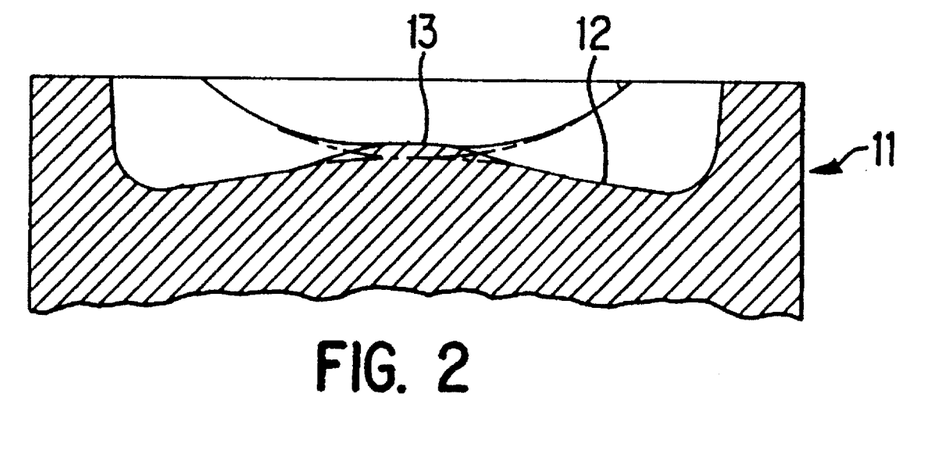
FIG. 2 shows a sectional view of a double-form jig.
Figure 3:
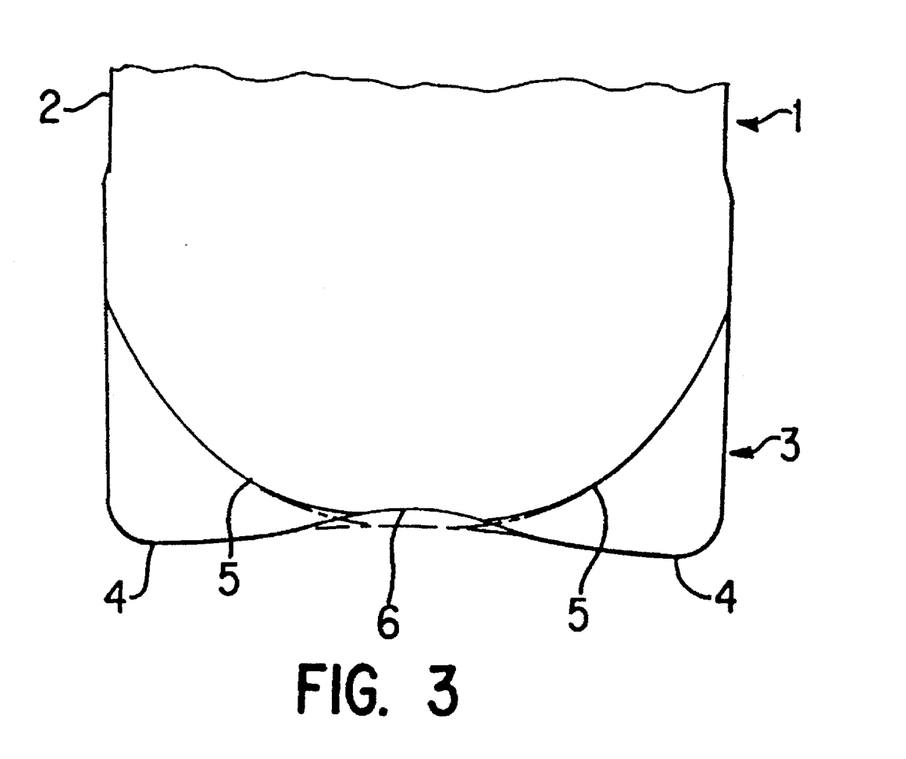
FIG. 3 shows a sectional view of a bottom portion of a bottle reformed by a double-form jig shown in FIG. 2.

FIG. 2 shows a center face 13 of a mold surface 12 of a double-form jig. The mold surface 12 is below the center face 13 as shown by the dotted lines. Thus, the center face 13 projects higher than the mold surface 12 of the bottom mold of the blow molding device. Therefore, the bottom portion 3 of the bottle 1 completed by the double-form jig 11, as shown in FIG. 3, has the center part 6 recessed inwardly when compared to the dotted line. The curvature of the leg portion 4 towards the inside becomes smaller and the curvature of the valley portion 5 becomes larger.

The reformation of the center part 6 has limitations. The bottle 1 is blow molded for 2 seconds of blow time in a blow mold having the bottom mold height of 3.9 mm. Five seconds after being released from the mold, the bottle 1 is reformed and cooled in the cooling apparatus 8 having the double-form jig 11, as shown in FIG. 1. When the double-form jig 11 has a height of 5 mm, the reform quantity is 1.1 mm, the height thereof is 4.43 mm and the mold ratio is 114%. When the double-form jig 11 has a height of 6 mm, the reform quantity is 2.1 mm, the height thereof is 5.49 mm and the mold ratio is 141%.

Further, when the double-form jig 11 with the height of 7 mm is applied, the reform quantity is 3.1 mm, the height is 5.86 mm and the reform ratio is 150%. The reform ratio is calculated by the formula: (the height of the reform bottom portion 3/the height of the bottom mold of a blow mold device)×100.

Breakage tests are performed using the reformed bottles mentioned above. When a double-form jig 11 having a height of 5 mm is used, breakages occur in one out of 15 bottles. For a double-form jig 11 having a height of 6 mm, breakages occur in 9 out of 15 bottles. For a double-form jig 11 having a height of 7 mm, breakages occur in 12 out of 15 bottles.

Figure 7:
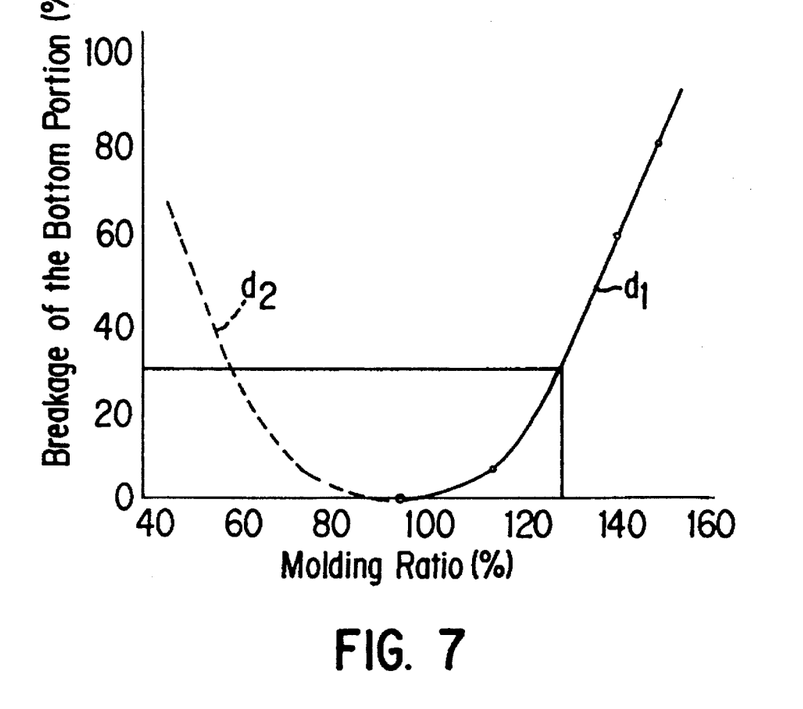
FIG. 7 shows a graph of a breakage ratio of the bottom portion according to the reform ratio.

As shown in FIG. 7, the allowable breakage ratio of the prior art is 30%. For 30% breakage ratio, the mold ratio of the present invention is nearly 130%. As the forming capability of the present biaxial blow molding method and device are advanced, the mold ratio of the present invention may be limited to below 120%.

The Effects of the Invention

The present invention provides the following features:

The bottom portion of the bottle being biaxially stretch molded is cooled immediately after it is released from the mold, so that the blowing time of the blow mold can be shortened and the productivity improved.

The bottom portion of the bottle after blow molding is compulsively cooled after the bottle is released from the mold. Thus, a new blow mold is not required and bottles are produced with lower cost equipment.

With a reform jig 9 or a double-form jig 11, the heights of the bottom portion of the bottle is maintained sufficiently high so that bottles with higher resistance against pressure and outer force can be produced.

The cooling apparatus comprises a reform jig 9, or double-form jig 11, a press jig 16 and a cooling nozzle 17. Thus, the cooling apparatus is simple and it handles and operates easily.

We claim:

1. A cooling apparatus for cooling pressure resisting bottles made of synthetic resin, each of the bottles having a big foot type petaloid bottom, said apparatus being provided for cooling the bottom of each of said bottles after said bottles are released from a molding device, said apparatus comprising:

a reform jig having a mold face, the mold face having a center part with a projecting height that is substantially equal to a height of a center part of a bottom mold of the molding device, said reform jig further comprising a jet mouth for providing cooling air to the center part of said mold face;

a press jig capable of holding said bottles, said press jig being cooperable with said reform jig to press said bottom of each of said bottles to the mold face of said reform jig; and a cooling nozzle that enters inside each of said bottles, blows air toward an upper surface of said bottom of each of said bottles and provides pressure inside each of said bottles.

2. A cooling apparatus for cooling at least one pressure resisting bottle of synthetic resin, each of said at least one bottle having a big foot type petaloid bottom, said apparatus being provided for cooling the bottom of each of said at least one bottle after said at least one bottle is released from a molding device, said apparatus comprising:

a double-form jig comprising a mold face, the mold face having a center part with a projecting height that is higher than a height of a center part of a bottom mold of the molding device, said double-form jig further including a jet mouth for providing cooling air to the center part of said mold face;

a press jig capable of holding each of said at least one bottle, said press jig being cooperable with said double-form jig to press said bottom of each of said at least one bottle to the mold face of said double-form jig; and a cooling nozzle that enters inside each of said at least one bottle, blows air to an upper surface of the bottom of each of said at least one bottle and provides pressure inside each of the at least one bottle.

* * * * *

UNITED STATES PATENT AND TRADEMARK OFFICE
CERTIFICATE OF CORRECTION

PATENT NO.    : 5,585,125
DATED         : December 17, 1996
INVENTOR(S)   : Takao Iizuka, Mamoru Oshida, Makoto Takada Page 1 of 1

It is certified that error appears in the above-identified patent and that said Letters Patent is hereby corrected as shown below:

Title page,
Item 22, change "July 20, 1992" to -- July 20, 1993 --.
Item 86, change §371 date from "June 21, 1969" to -- June 21, 1994 --.

Signed and Sealed this

Twenty-first Day of August, 2001

*Attest:*

*Nicholas P. Godici*

NICHOLAS P. GODICI
*Attesting Officer*     *Acting Director of the United States Patent and Trademark Office*